US012617290B2

(12) United States Patent (10) Patent No.: US 12,617,290 B2
Selvaraj et al. (45) Date of Patent: May 5, 2026

(54) DYNAMIC VEHICLE SPEED CONTROL

(71) Applicant: Cummins Inc., Columbus, IN (US)

(72) Inventors: Balan Mariappan Selvaraj, Columbus, IN (US); Gajendran Bakthavachalam, Columbus, IN (US); Oluwademilade Adedunmolu Alabi, Columbus, IN (US); Richard A. Booth, Columbus, IN (US); Jaime Antonio Lugo-Castillo, Unionville, IN (US)

(73) Assignee: Cummins Inc., Columbus, IN (US)

( * ) Notice: Subject to any disclaimer, the term of this patent is extended or adjusted under 35 U.S.C. 154(b) by 230 days.

(21) Appl. No.: 18/203,400

(22) Filed: May 30, 2023

(65) Prior Publication Data

US 2024/0399889 A1 Dec. 5, 2024

(51) Int. Cl.
B60L 15/20 (2006.01)

(52) U.S. Cl.
CPC ....... B60L 15/2009 (2013.01); B60L 2240/32 (2013.01); B60L 2240/423 (2013.01); B60L 2250/26 (2013.01)

(58) Field of Classification Search
CPC ............. B60L 15/2009; B60L 2240/32; B60L 2240/423; B60L 2550/26
See application file for complete search history.

(56) References Cited

U.S. PATENT DOCUMENTS

| | | | | |
|---|---|---|---|---|
| 7,617,896 | B2 * | 11/2009 | Ogata | .................... B60W 30/19 |
| | | | | 180/293 |
| 8,983,701 | B2 * | 3/2015 | Tagawa | ................. B60W 10/06 |
| | | | | 180/65.265 |
| 11,273,811 | B2 | 3/2022 | Books et al. | |
| 2008/0183374 | A1 * | 7/2008 | Ruiz | ........................ F02P 5/151 |
| | | | | 701/115 |
| 2009/0145673 | A1 * | 6/2009 | Soliman | ................. B60K 6/442 |
| | | | | 701/22 |
| 2010/0004808 | A1 * | 1/2010 | Tang | ......................... B60L 7/18 |
| | | | | 701/22 |
| 2015/0105950 | A1 * | 4/2015 | Fleege | .................... B60L 15/10 |
| | | | | 701/22 |

(Continued)

FOREIGN PATENT DOCUMENTS

| | | |
|---|---|---|
| CN | 104908610 A | 9/2015 |
| CN | 105904997 A | 8/2016 |

(Continued)

*Primary Examiner* — Scott A Browne

*Assistant Examiner* — Izcalli Rios-Aguirre

(74) *Attorney, Agent, or Firm* — Faegre Drinker Biddle & Reath LLP

(57) ABSTRACT

A system for controlling a vehicle speed of a vehicle is described. The system comprises a motor, a vehicle speed sensor, a vehicle speed governor, and a controller. The motor is configured to provide an output torque for driving the vehicle. The vehicle speed sensor provides a vehicle speed signal corresponding to the vehicle speed. The vehicle speed governor has a vehicle speed limit for the vehicle, where the vehicle speed governor adjusts the vehicle speed limit according to a desired direction of travel of the vehicle and a load corresponding to the motor. The desired direction of travel is selectable by an operator of the vehicle. The controller is configured to adjust the output torque of the motor according to the vehicle speed limit and the vehicle speed signal.

20 Claims, 5 Drawing Sheets

(56)          References Cited

U.S. PATENT DOCUMENTS

2020/0010065 A1 *   1/2020   Books ................... B60W 10/18
2021/0053552 A1 *   2/2021   Szczepaniak ......... B60W 10/18

FOREIGN PATENT DOCUMENTS

CN          109515213  A      3/2019
CN          112441014  B      3/2021
JP          2019137362 A      8/2019
KR          101944485  B1     2/2019
WO          2014056653 A1     4/2014

* cited by examiner

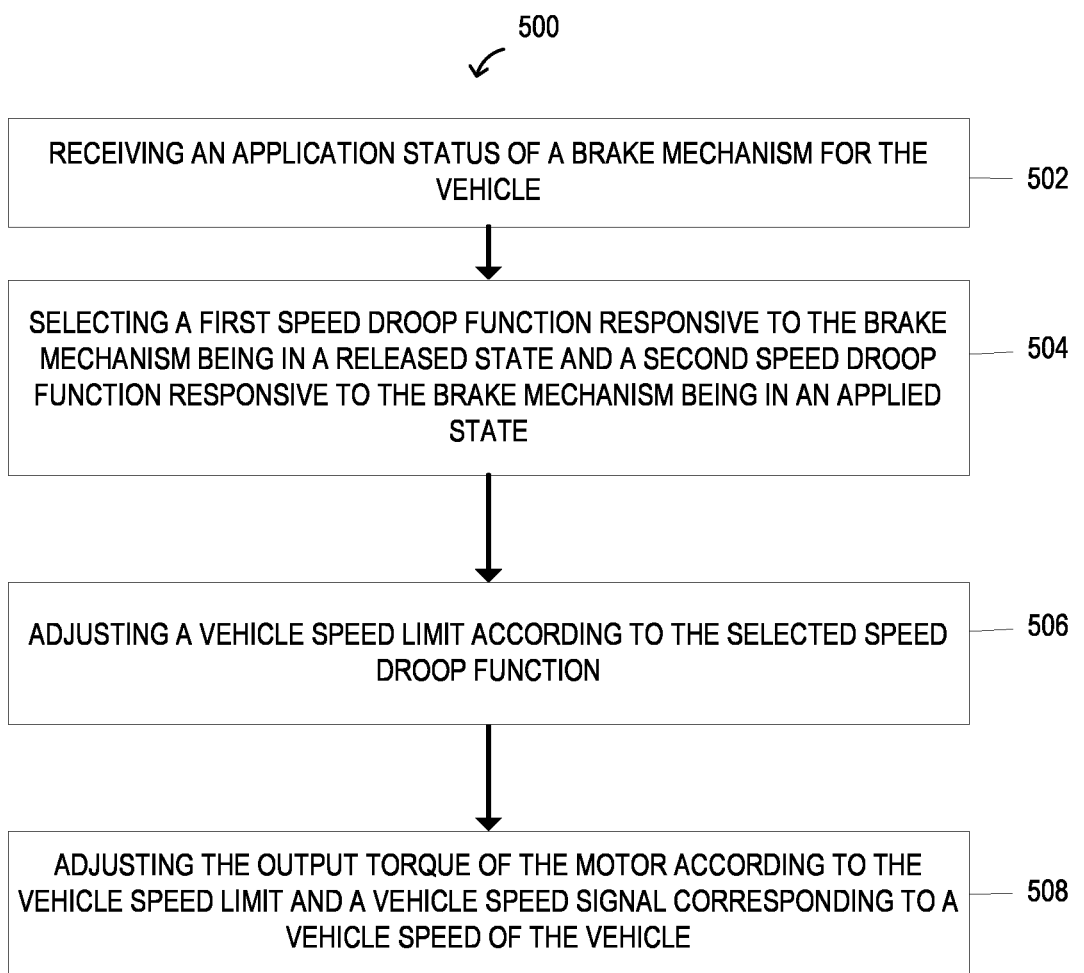

500

| RECEIVING AN APPLICATION STATUS OF A BRAKE MECHANISM FOR THE VEHICLE | 502 |

| SELECTING A FIRST SPEED DROOP FUNCTION RESPONSIVE TO THE BRAKE MECHANISM BEING IN A RELEASED STATE AND A SECOND SPEED DROOP FUNCTION RESPONSIVE TO THE BRAKE MECHANISM BEING IN AN APPLIED STATE | 504 |

| ADJUSTING A VEHICLE SPEED LIMIT ACCORDING TO THE SELECTED SPEED DROOP FUNCTION | 506 |

| ADJUSTING THE OUTPUT TORQUE OF THE MOTOR ACCORDING TO THE VEHICLE SPEED LIMIT AND A VEHICLE SPEED SIGNAL CORRESPONDING TO A VEHICLE SPEED OF THE VEHICLE | 508 |

Fig. 5

DYNAMIC VEHICLE SPEED CONTROL

BACKGROUND

Vehicles may be operated over a wide range of speeds, for example, high speeds on a highway, slow speeds when maneuvering to park or position the vehicle, etc. Management of vehicle speed may be assisted by a vehicle speed governor that uses a pre-set vehicle speed limit. For example, a maximum speed governor may use a pre-set vehicle speed limit of 65 miles per hour for a tractor trailer or a cruise control governor may use an adjustable speed limit selectable by an operator. In some examples, an idle speed governor may use a pre-set idle speed (e.g., 1500 revolutions per minute) that is matched to a vehicle speed for "creeping" a vehicle at low vehicle speeds. Generally, a torque converter allows a vehicle equipped with an Automatic Transmission (AT) to seamlessly edge forward (or backward) from a full stop with little or no effort from the operator, up to a vehicle speed corresponding to the idle speed.

A direct-drive electric vehicle is powered by the engagement of a motor and a battery without the need of an engine or transmission. The motor receives power from the energy stored in the direct-drive vehicle battery. In general, direct-drive electric vehicles are an efficient alternative to a vehicle with an internal combustion engine (ICE) that utilizes gasoline or diesel power. Unlike the ICE, a direct-drive electric vehicle does not have a combined driveline clutch and minimum power plant speed that establishes a minimum vehicle speed. However, operating a direct-drive electric vehicle at very low speeds and loads may be inefficient. In a parking or other low speed maneuvering situation, it may be desirable to have precise control over an output torque of the motor. Moreover, direct-drive electric vehicles may have different configurations of transmission gear ratios, rear axle ratios, or tire size that make calibration of a vehicle speed (e.g., miles per hour) relative to a motor speed (e.g., revolutions per minute) challenging.

It is with respect to these and other general considerations that embodiments have been described. Also, although relatively specific problems have been discussed, it should be understood that the embodiments should not be limited to solving the specific problems identified in the background.

SUMMARY

A system for controlling a vehicle speed of a vehicle is provided. The system comprises a motor configured to provide an output torque for driving the vehicle; a vehicle speed sensor that provides a vehicle speed signal corresponding to the vehicle speed; a vehicle speed governor having a vehicle speed limit for the vehicle; and a controller configured to adjust the output torque of the motor according to the vehicle speed limit and the vehicle speed signal. The vehicle speed governor adjusts the vehicle speed limit according to a desired direction of travel of the vehicle and a load corresponding to the motor, the desired direction of travel being selectable by an operator of the vehicle.

A system for controlling a vehicle speed of a vehicle is provided. The system comprises: a motor configured to provide an output torque for driving the vehicle; a vehicle speed sensor that provides a vehicle speed signal corresponding to the vehicle speed of the vehicle; a brake mechanism configured to receive an indication of a desired change in the vehicle speed; a vehicle speed governor having a vehicle speed limit for the vehicle; and a controller configured to adjust the output torque of the motor according to the vehicle speed limit and the vehicle speed signal. The vehicle speed governor adjusts the vehicle speed limit according to a first speed droop function responsive to the brake mechanism being in a released state and according to a second speed droop function responsive to the brake mechanism being in an applied state.

A method for controlling a vehicle speed of a vehicle is provided. The method comprises: receiving an application status of a brake mechanism for the vehicle; selecting a first speed droop function responsive to the brake mechanism being in a released state and a second speed droop function responsive to the brake mechanism being in an applied state; adjusting a vehicle speed limit according to the selected speed droop function; and adjusting an output torque of a motor for driving the vehicle according to the vehicle speed limit and a vehicle speed signal corresponding to a vehicle speed of the vehicle.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 5 shows a flowchart of an example method for controlling a vehicle speed of a vehicle, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of a controller for a vehicle, such as a battery electric vehicle or hybrid vehicle. The controller is configured to control a vehicle speed of the vehicle, for example, at high speeds on a road or highway, low speeds when maneuvering or parking, etc. Generally, the controller adjusts an output torque of a motor and provides control of a vehicle speed limit so that the vehicle accelerates up to and maintains the vehicle speed limit. The vehicle speed limit may be a high limit in some scenarios, for example, to limit a highway speed of a tractor trailer to 100 kilometers per hour or 65 miles per hour. In other scenarios, the vehicle speed limit may be a low limit, for example, to provide a creep speed of 3 miles per hour or 5 kilometers per hour. The controller adjusts the vehicle speed limit according to an output torque of the motor, for example, by reducing the vehicle speed limit when a load of the motor exceeds a threshold. By reducing the vehicle speed limit, the controller reduces output power, thereby improving power efficiency, when the vehicle encounters a higher load, such as when creeping up a slope or over a speed bump. This and many further embodiments for a controller are described herein.

Figure 1:
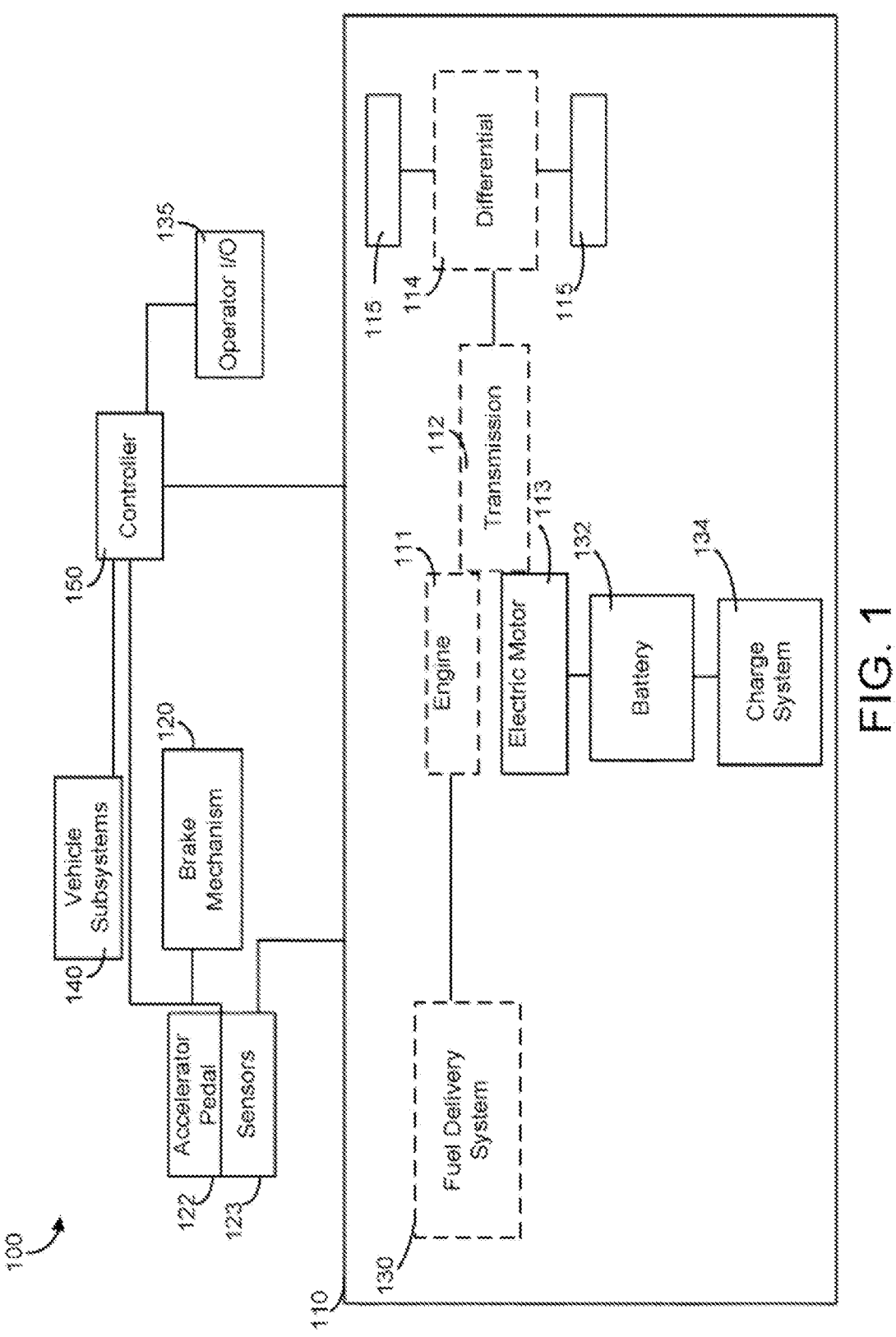
FIG. 1 shows a schematic block diagram of an example vehicle having a brake mechanism and controller, according to an example embodiment.

FIG. 1 depicts an example block diagram of a vehicle 100, according to an example embodiment. The vehicle 100 may be a vehicle, such as a direct-drive electric vehicle or a hybrid vehicle, powered by or otherwise operable via a battery, generator (e.g., a power generator, generator plant, electric power strip, on-board rechargeable electricity storage system, etc.), a motor (e.g., an electric motor, traction motor, etc.), etc. The vehicle 100 may be operable in at least one of a reverse direction (e.g., a backward direction) and a non-reverse direction (e.g., a forward direction, angular direction, etc.). The vehicle 100 may be an on-road or off-road vehicle including, but not limited to, cars, trucks, ships, boats, vans, airplanes, spacecraft, or any other type of vehicle.

The vehicle 100 comprises a controller 150 communicably and operatively coupled to a powertrain system 110, a brake mechanism 120, an accelerator pedal 122, one or more sensors 123, an operator input/output (I/O) device 135, and one or more additional vehicle subsystems 140. It should be understood that the vehicle 100 may include additional, fewer, and/or different components/systems than depicted in FIG. 1, such that the principles, methods, systems, apparatuses, processes, and the like of the present disclosure are intended to be applicable with any suitable vehicle configuration. It should also be understood that the principles of the present disclosure should not be interpreted to be limited to on-highway vehicles; rather, the present disclosure contemplates that the principles may also be applied to a variety of other applications including, but not limited to, off-highway construction equipment, mining equipment, marine equipment, locomotive equipment, etc.

The powertrain system 110 facilitates power transfer from a motor 113 and/or a battery 132 to power the vehicle 100. In an example embodiment, the powertrain system 110 includes a motor 113 operably coupled to a battery 132 and charge system 134, where the motor 113 transfers power to a final drive (shown as wheels 115) to propel the vehicle 100. As depicted, the powertrain system 110 includes various components that may be included in a direct-drive electric vehicle and/or a hybrid vehicle, such as for example, an engine 111 operably coupled to a transmission 112, the motor 113, and a differential 114, where the differential 114 transfers power output from the transmission 112 to the final drive 115 to propel the vehicle 100. As a brief overview and in this configuration, the controller 150 of the vehicle 100 (e.g., an electric vehicle) provides electricity to the motor 113 (e.g., an electric motor) in response to various inputs received by the controller 150, for example, from an accelerator pedal 122, sensors 123, vehicle subsystems 140, charge system 134 (e.g., a battery charging system, rechargeable battery, etc.), etc. In some embodiments, electricity provided to power the motor 113 may be provided by an onboard gasoline-engine generator, a hydrogen fuel cell, etc.

In some embodiments, the vehicle 100 optionally includes the engine 111 which may be structured as an internal combustion engine that receives a chemical energy input (e.g., a fuel such as natural gas, gasoline, ethanol, or diesel) from a fuel delivery system 130, and combusts the fuel to generate mechanical energy, in the form of a rotating crankshaft. The transmission 112 receives the rotating crankshaft and manipulates the speed of the crankshaft (e.g., the engine speed, which is usually expressed in revolutions-per-minute (RPM)) to effect a desired drive shaft speed. A rotating drive shaft may be received by the differential 114, which provides the rotation energy from the drive shaft to the final drive 115. The final drive 115 then propels or moves the vehicle 100.

In some examples, the vehicle 100 optionally includes the transmission 112. The transmission 112 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (e.g., gears, for a geared transmission) that affect different output speeds based on an engine speed or motor speed. Like the engine 111 and the transmission 112, motor 113, differential 114, and final drive 115 may be structured in any configuration dependent on the application (e.g., the final drive 115 is structured as wheels in an automotive application and a propeller in an airplane application).

In some examples, the vehicle 100 is a battery electric vehicle and omits the engine 111 and the fuel delivery system 130. Moreover, in some examples, the transmission 112 is omitted and the motor 113 is directly coupled to the differential 114. In still other examples, the motor 113 is directly coupled to the final drive 115 as a direct drive application. In these examples, the vehicle 100 may comprise multiple instances of the motor 113, for example, one instance for each driven wheel, one instance per driven axle, etc.

The brake mechanism 120 may be implemented as a brake (e.g., hydraulic disc brake, drum brake, air brake, etc.), braking system, or any other device configured to prevent or reduce motion by slowing or stopping components (e.g., a wheel, axle, pedal, crankshaft, driveshaft, etc. of the vehicle 100). Generally, the brake mechanism 120 is configured to receive an indication of a desired change in the vehicle speed. In some examples, the brake mechanism 120 comprises a brake pedal that is operable between a released state and an applied state by an operator of the vehicle 100. The brake pedal may be configured as a pressure based system that is responsive to pressure, or a travel based system that is responsive to a travel distance of the pedal, where a braking force applied by the brake mechanism 120 is based on (e.g., proportional to) the pressure and/or travel distance. In some examples, all or a portion of the brake mechanism 120 is incorporated into the motor 113, for example, as a regenerative brake mechanism.

Generally, the released state of the brake mechanism corresponds to a brake pedal in a default location where the brake mechanism is not applied, for example, when the operator's foot is not placed on the brake pedal at all, or merely resting on the brake pedal such that a minimum actuation force is not exceeded (e.g., a spring-assisted, hydraulic-assisted, or servo-assisted force that pushes the brake pedal to the default location). In some examples or scenarios, the brake pedal is combined with the accelerator pedal 122, such as in a "one-pedal driving" configuration. In some examples, the applied state of the brake mechanism 120 may correspond to the brake pedal being pressed with a force that meets or exceeds the minimum actuation force. In other examples, the applied state of the brake mechanism 120 corresponds to the brake pedal being pressed so that the travel distance of the brake pedal meets or exceeds a minimum travel distance. Generally, the minimum actuation force and/or minimum travel distance help to prevent accidental actuation of the brake mechanism 120. Different levels of the minimum actuation force and/or minimum travel distance may be used for different implementations of the brake mechanism 120, for example, relatively higher forces or travel distance for a foot-actuated brake pedal, relatively lower forces or travel distance for a hand-actuated brake lever. Although the brake pedal may have a range of pressures and/or travel distances that provide at least some braking effect on the vehicle 100 (e.g., high pressures for hard or emergency braking, low pressures for gradual braking or "feathering" the brakes), this range of pressures and/or travel distances are within the applied state.

The released state may correspond to an indication of a desired increase in vehicle speed, while the applied state may correspond to an indication of a desired reduction in vehicle speed. In some scenarios, a reduction in actuation force and/or travel distance corresponds to a desired increase in vehicle speed, while an increase in actuation force and/or travel distance corresponds to a desired reduction in vehicle speed.

The accelerator pedal 122 may be structured as any type of torque and/or speed request device included with a system (e.g., a floor-based pedal, an acceleration lever, paddle or joystick, etc.). Further, the sensors 123 may include any type of sensors included with the brake mechanism 120, accelerator pedal 122, or any other component and/or system included in the powertrain system 110 of a vehicle. For example, the sensors 123 may include a vehicle speed sensor that provides a vehicle speed signal corresponding to a vehicle speed of the vehicle 100, an accelerator pedal position sensor that acquires data indicative of a depression amount of the pedal (e.g., a potentiometer), a brake mechanism sensor that acquires data indicative of a depression amount (pressure or travel) of the brake mechanism 120 (e.g., a brake, brake pedal, etc.), a coolant temperature and pressure sensor, an ambient air temperature and pressure sensor, a fuel pressure sensor, an injection pump speed sensor, or other suitable sensors.

As depicted, the vehicle 100 includes the operator I/O device 135. The operator I/O device 135 enables an operator of the vehicle to communicate with the vehicle 100 and the controller 150. Analogously, the operator I/O device 135 enables the vehicle or controller 150 to communicate with the operator. For example, the operator I/O device 135 may include, but is not limited, an interactive display (e.g., a touchscreen, etc.) having one or more buttons/input devices, haptic feedback devices, an accelerator pedal, a brake pedal, a shifter or other interface for the transmission 112, a cruise control input setting, a navigation input setting, etc. Via the operator I/O device 135, the controller 150 can also provide commands, instructions, and/or information to the operator (or a passenger).

As also shown, the vehicle 100 includes one or more vehicle subsystems 140. The various vehicle subsystems 140 may generally include one or more sensors (e.g., a speed sensor, ambient pressure sensor, temperature sensor, etc.), as well as any subsystem that may be included with a vehicle. The vehicle subsystems 140 may also include torque sensors for one or more of the motor(s) 113, transmission 112, differential 114, and/or final drive 115.

The controller 150 is communicably and operatively coupled to the powertrain system 110, brake mechanism 120, accelerator pedal 122, the operator I/O device 135, and the one or more vehicle subsystems 140. Communication between and among the components may be via any number of wired or wireless connections (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data. Because the controller 150 is communicably coupled to the systems and components in the vehicle 100 (e.g., a direct-drive electric vehicle, etc.) of FIG. 1, the controller 150 is structured to receive data (e.g., instructions, commands, signals, values, etc.) from one or more of the components shown in FIG. 1.

It should also be understood that other or additional operating parameters to control the vehicle speed may be used. For example, additional parameters may include motor speed, battery characteristics (e.g., battery voltage), characteristics of the fuel delivery system 130 (e.g., timing, quantity, rate, etc. of a hybrid vehicle), characteristics regarding the brake position/operation and so on.

Figure 2:
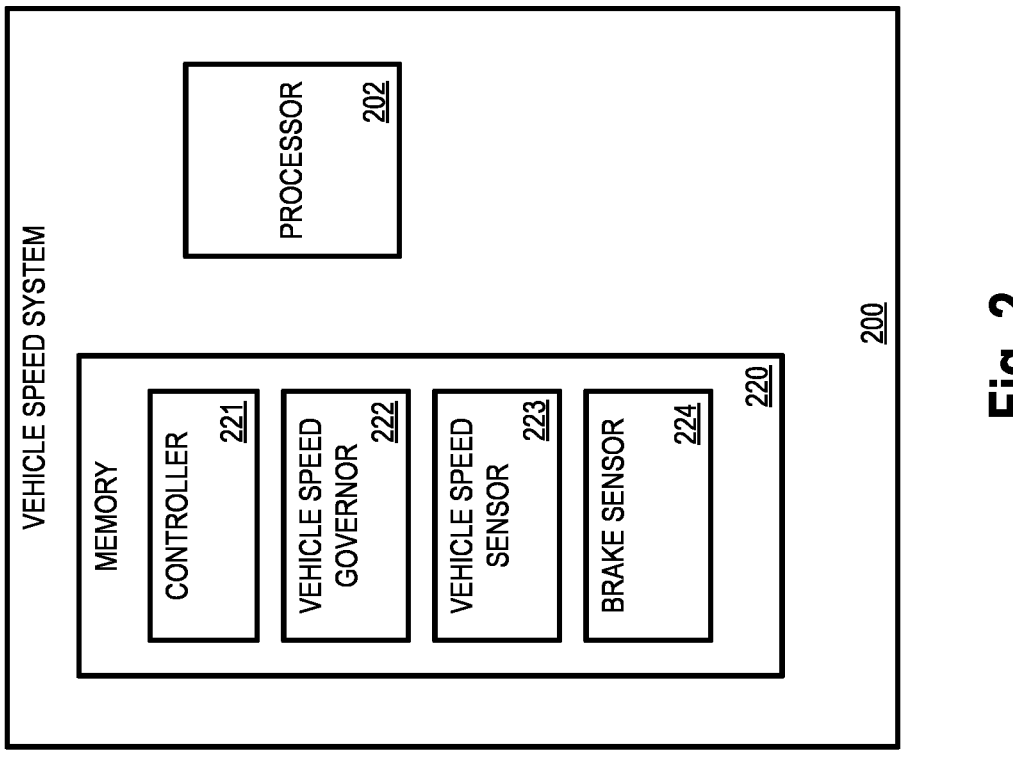
FIG. 2 shows a schematic block diagram of the controller included in the vehicle of FIG. 1, according to an example embodiment.

FIG. 2 is a schematic block diagram of a vehicle speed system 200 included in a vehicle according to an example embodiment. In some examples, the vehicle speed system 200 generally corresponds to the controller 150 of the vehicle 100. In the example shown in FIG. 2, the vehicle speed system 200 comprises a processor 202 and a memory 220 or other non-transitory computer readable medium. It should be understood that the vehicle speed system 200 of FIG. 2 depicts only one implementation of the vehicle speed system 200, and any other controller capable of performing the operations described herein can be used. In some embodiments, the vehicle speed system 200 may be implemented as one or more of a motor controller, powertrain system controller, etc. The processor 202 can include a microprocessor, programmable logic controller (PLC) chip, an application specific integrated circuit (ASIC), or any other suitable processor. The processor 202 is in communication with the memory 220 and structured to execute instructions, algorithms, commands or otherwise programs stored in the memory 220.

The memory 220 includes any of the memory and/or storage components discussed herein or suitable alternatives. For example, the memory 230 may include RAM and/or cache of the processor 202. The memory 220 may also include one or more storage devices (e.g., hard drives, flash drives, non-transitory computer readable media, etc.) either local or remote to the vehicle speed system 200. The memory 220 may be structured to store sensor values, look up tables, algorithms, instructions, executable machine code, etc.

The vehicle speed system 200 comprises a controller 221, a vehicle speed governor 222, a vehicle speed sensor 223, and a brake sensor 224. These components may be communicatively coupled to one or more of the powertrain system 110, the brake mechanism 120, the accelerator pedal 122, the sensors 123, the vehicle subsystems 140, and/or the operator I/O device 135. In the example shown in FIG. 2, these components are implemented as instructions and/or sensor values stored in the memory 220. However, in other embodiments, one or more of these components may be implemented as an integrated circuit, analog or digital sensor, or other suitable format. In some examples, one or more analog to digital converters generate sensor values (e.g., the vehicle speed, motor speed, brake application state) that are placed into the memory 220.

The vehicle speed sensor 223 is configured to provide a vehicle speed signal corresponding to the vehicle speed of the vehicle 100. The vehicle speed signal may be an analog signal or digital signal corresponding to a speed value, such as 60 kilometers per hour, 20 miles per hour, etc. Generally, the vehicle speed corresponds to a ground speed, air speed, or nautical speed of the vehicle, as distinguished from a motor speed (e.g., RPM) of the motor 113. In various examples, the vehicle speed sensor may read, monitor, or otherwise record a speed of rotation of the final drive 115, the differential 114, the transmission 112, or motor 113, which provide an indication of a change in the vehicle speed.

The brake sensor 224 is configured to provide an indication of a current state of the brake mechanism 120, for example, whether the brake pedal is in an applied state or released state, as described above. In some examples, the brake sensor 224 also provides a suitable indication of pressure and/or travel of the brake pedal.

The vehicle speed governor 222 provides and/or manages a vehicle speed limit for the vehicle 100. Generally, the vehicle speed governor 222 adjusts the vehicle speed limit according to a desired direction of travel of the vehicle (e.g. a reverse direction or non-reverse direction) and a load corresponding to the motor 113. In some examples, the vehicle speed governor 222 dynamically adjusts the vehicle speed limit, e.g., in real-time or near real-time, in response to changes in load or vehicle speed, in response to input from the brake mechanism 120 or accelerator pedal 122, etc. The desired direction of travel is selectable by an operator of the vehicle 100, for example, by selecting a direction and/or gear using the operator I/O device 135. In one example, the operator selects between a Forward and Reverse direction using buttons or a shift lever. In another example, the operator selects a gear from among a Reverse gear and one or more Forward gears of the transmission 112 using buttons, a shift lever, or other suitable interface.

In some examples, the vehicle speed governor 222 comprises one or more reference speed limits, such as a forward speed limit and a reverse speed limit. The different reference speed limits allow for improved control over vehicle speed. For example, when moving in a reverse direction, a reverse speed reference may be used that is relatively low (e.g., 3 miles per hour, 6 kilometers per hour, etc.) and more suitable for the reverse direction where controlling a direction of the vehicle may be less intuitive, especially when the vehicle 100 is pulling a trailer and has a risk of jack-knifing. As another example, one or more forward speed references may be used when traveling in a forward direction, for example, 65 miles per hour. Advantageously, the vehicle speed governor 222 uses a vehicle speed as an input, instead of using a rotational speed of the motor 113. This approach may avoid or reduce a complexity of calibration of the motor 113, for example, to calibrate the RPMs of the motor 113 along with transmission gear ratios, rear axle ratios, tire size, etc. to obtain an accurate vehicle speed for a given motor speed.

The vehicle speed governor 222 may use different forward speed references for different forward gears, when applicable and responsive to a gear selection, for example, a first gear speed reference of 10 miles per hour, a second gear speed reference of 25 miles per hour, etc. Different speed references may limit power consumption of the motor 113 and improve battery efficiency, in some scenarios. Different reference speeds may also be dynamically and/or automatically selected responsive to a gear change by the operator or other controller within the vehicle 100 (e.g., a cruise control feature, an automatic gear shift feature, etc.). In some examples, the vehicle speed governor 222 dynamically adjusts (e.g., reduces or increases) a forward speed limit and/or reverse speed limit according to an output torque of the motor 113, as described herein.

The controller 221 is configured to adjust an output torque of a motor (e.g., the motor 113) according to the vehicle speed limit from the vehicle speed governor 222 and the vehicle speed signal from the vehicle speed sensor 223. For example, the controller 221 may process the vehicle speed and the vehicle speed limit and generate a corresponding request or instruction for an output torque to be provided by the motor 113. In some examples, the controller 221 may further process a position of the accelerator pedal 122, a state of the brake mechanism from the brake sensor 224, a cruise control setting of the operator I/O device 135, or other suitable values or signals. The controller 221 may prevent or reduce a likelihood of the vehicle 100 exceeding the vehicle speed limit. For example, the controller 221 may ignore an input from the accelerator pedal 122 (e.g., a relatively high or full throttle input) when the vehicle 100 is already at the vehicle speed limit, such as when traveling down a steep grade.

When the brake mechanism 120 is in the applied state (e.g., the brake mechanism 120 is pressed or otherwise pushed), a force is applied such that the vehicle speed is adjusted (e.g., decreases) and the vehicle 100 is slowed. The vehicle speed may be adjusted in proportion to an application of the brake mechanism. For example, in the applied state, the brake mechanism 120 applies a force which may cause engagement of a switch and/or friction between components of a brake system (e.g., the brake pads, brake rotors, etc.) such that the indication of the desired change in vehicle speed, for example a reduced vehicle speed, is read by the sensors 123. In some examples, the application of a force by the brake mechanism 120 in the applied state may cause the motor 113 to enter a power generation state (e.g., the motor generates electricity which is provided to the battery 132). In the power generation state, the motor 113 causes the final drive 115 to slow which reduces the vehicle speed.

Alternatively or additionally, the brake mechanism 120 may be in a released state. The brake mechanism 120 may enter the released state when the brake mechanism is released or when a sufficient force is no longer applied to the brake mechanism 120, as described above. For example, the brake mechanism 120 (e.g., the brake pedal) enters the released state when the brake pedal is released by the operator of the vehicle 100. In turn, the vehicle 100 may begin to move or otherwise accelerate up to a vehicle speed in a direction determined by a gear selection system (e.g., in a reverse direction or non-reverse direction).

The controller 221 may be configured to activate the vehicle speed governor 222 (e.g., a speed limiter device), in various examples. In some examples, the vehicle speed governor 222 is activated in a "creep mode" responsive to the brake mechanism 120 being in the released state and the accelerator pedal 122 being in a released state. In other examples, the creep mode is activated in response to an input from the operator I/O device 135 (e.g., by activating a menu item or button press using the operator I/O device 135). The creep mode may correspond to a relatively low vehicle speed limit of the vehicle speed governor 222, as described above. In some examples, the creep mode may correspond to a first vehicle speed limit for creeping in a forward direction and a second vehicle speed limit, lower than the first vehicle speed limit, for creeping in a reverse direction, to improve maneuverability and safety.

In other examples, the vehicle speed governor 222 is activated in a "cruise mode" responsive to the accelerator pedal 122 being pressed, or when the vehicle speed meets or exceeds a cruise threshold (e.g., 7 miles per hour). The cruise mode may correspond to a vehicle speed limit that is set for safety and/or reduced battery consumption, such as 65 miles per hour for a vehicle that may travel over a highway or 15 miles per hour for a vehicle that carries heavy loads (e.g., 100 k pounds, 200 k pounds, etc.) within a shipping container yard.

As used herein, "vehicle speed governor" may be used to refer to a device, system, etc. structured to manage (e.g., control, limit, set, etc.) a vehicle speed and/or output torque. In some embodiments, the vehicle speed governor 222 may be implemented as a proportional governor (e.g., a droop governor) that operates according to a speed droop line, as described below with respect to FIGS. 3-4.

The creep mode of the vehicle speed governor 222 may be operable between a first speed and a second speed. The first speed may include a speed rate of zero miles per hour (mph). The first speed may include a speed rate greater or less than zero miles per hour. The second speed may include a calibratable speed. The calibratable speed may correspond to a low speed between 0 and 3 miles per hour. In some embodiments, the vehicle speed governor 222 may limit the vehicle speed such that when the vehicle speed increases or otherwise reaches a predetermined speed limit (e.g., a creep vehicle speed limit) the vehicle speed may be prevented from increasing further. In this regard, the vehicle speed sensor 223 may provide the vehicle speed. If the vehicle speed of, for example a direct-drive electric vehicle, reaches the predetermined speed limit, the vehicle speed governor 222 and/or the controller 221 may prevent the direct-drive electric vehicle and/or hybrid vehicle from exceeding the predetermined speed. If the vehicle speed of, for example a hybrid vehicle, reaches or exceeds the predetermined speed, the speed management circuit 232 may limit the flow of air and/or fuel to the engine 111 that causes combustion to, thereby, limit the vehicle speed.

When the brake mechanism 120 is in the applied state, for example, the brake pedal may be continuously applied which may reduce the vehicle speed causing the vehicle speed to go to zero miles per hour. When the brake mechanism 120 is released (e.g., moves from the applied state to the released state), the vehicle speed governor 222 may gradually (e.g., slowly) ramp up or otherwise increase the vehicle speed from the first speed to the calibratable speed, e.g., the creep vehicle speed limit. Alternatively or additionally, if the brake mechanism 120 and the accelerator pedal 122 are released, the vehicle speed governor 222 gradually (e.g., slowly) ramps up or otherwise increases from the first speed to the calibratable speed. Although the above example includes a nominal speed between 0 and 2.5 miles per hour, the example is understood not to limit the scope of vehicle speeds that may be achieved in various embodiments.

The controller 221 may be configured to adjust, via the vehicle speed governor 222, an output torque responsive to the vehicle speed. The term "output torque" as used herein may refer to the amount of force the motor outputs or otherwise provides. The output torque may be increased or reduced responsive to an adjustment of the vehicle speed. The controller 221 senses a reduction in the vehicle speed (e.g., via a reduction in RPM of the motor 113, final drive 115, etc.) due to the application of the brake mechanism 120 that works against the power of the motor 113, rolling up a steep grade, rolling over a speed bump, etc. In turn, the controller 221 may increase the output torque of the motor 113 to counteract the reduction in the vehicle speed, to maintain the vehicle speed, and/or to reach the vehicle speed limit of the vehicle speed governor 222. However, the vehicle speed governor 222 may reduce the vehicle speed limit, for example, according to a desired direction of travel of the vehicle and a load corresponding to the motor, as described below.

The powertrain system 110 eventually reaches an equilibrium at an increased load and a lower vehicle speed as the output torque increases when the brake mechanism 120 is continuously applied. For example, when a load corresponding to the motor 113 increases, the vehicle speed decreases (e.g., the RPM decreases). The load may increase due to the vehicle 100 being on an inclined road such that an increased output torque is required to maintain speed. The load may increase because the operator is applying a variable amount of force to the brake mechanism 120 such that the motor 113 increases the output torque to overcome the drag of the brakes. In some embodiments, the vehicle speed governor 222 adjusts the vehicle speed limit in proportion to the load increase. Accordingly, the vehicle speed governor 222 may include the droop governor as described above such that as the load increases, the vehicle speed decreases proportionally according to a speed droop line.

In some embodiments, the controller 221 is configured to generate suitable commands and/or signals structured to cause the motor 113 to maintain the vehicle speed between the first speed and the second speed. For example, the controller 221 may communicate operating parameters to the powertrain system 110 to actuate various components, circuits, or levers of the powertrain system 110 to cause the vehicle 100 to move or otherwise operate between the first speed and the second speed (e.g., a nominal speed between 0 and 2.5 miles per hour) such that the vehicle 100 automatically creeps or moves (e.g., gradually moves forward or backward, gradually reduces speed to zero, inches forward or backward, edges forward or backward, creeps, etc.) in a reverse direction and/or a non-reverse direction.

In further embodiments, the controller 221 is configured to deactivate the vehicle speed governor 222 responsive to at least one of the vehicle speed comprising a speed rate of zero miles per hour or receiving an indication of a desired change in vehicle acceleration (e.g., pressing the accelerator pedal 122). For example, if the application of the brake mechanism 120 causes the vehicle speed to decrease to zero miles per hour, the controller 221 may deactivate the vehicle speed governor 222. If the application of the accelerator pedal 122 indicates a desired change in vehicle acceleration (e.g., depressing the accelerator pedal 122 causes the vehicle speed to increase), the controller 221 may deactivate the vehicle speed governor 222.

Figure 3:
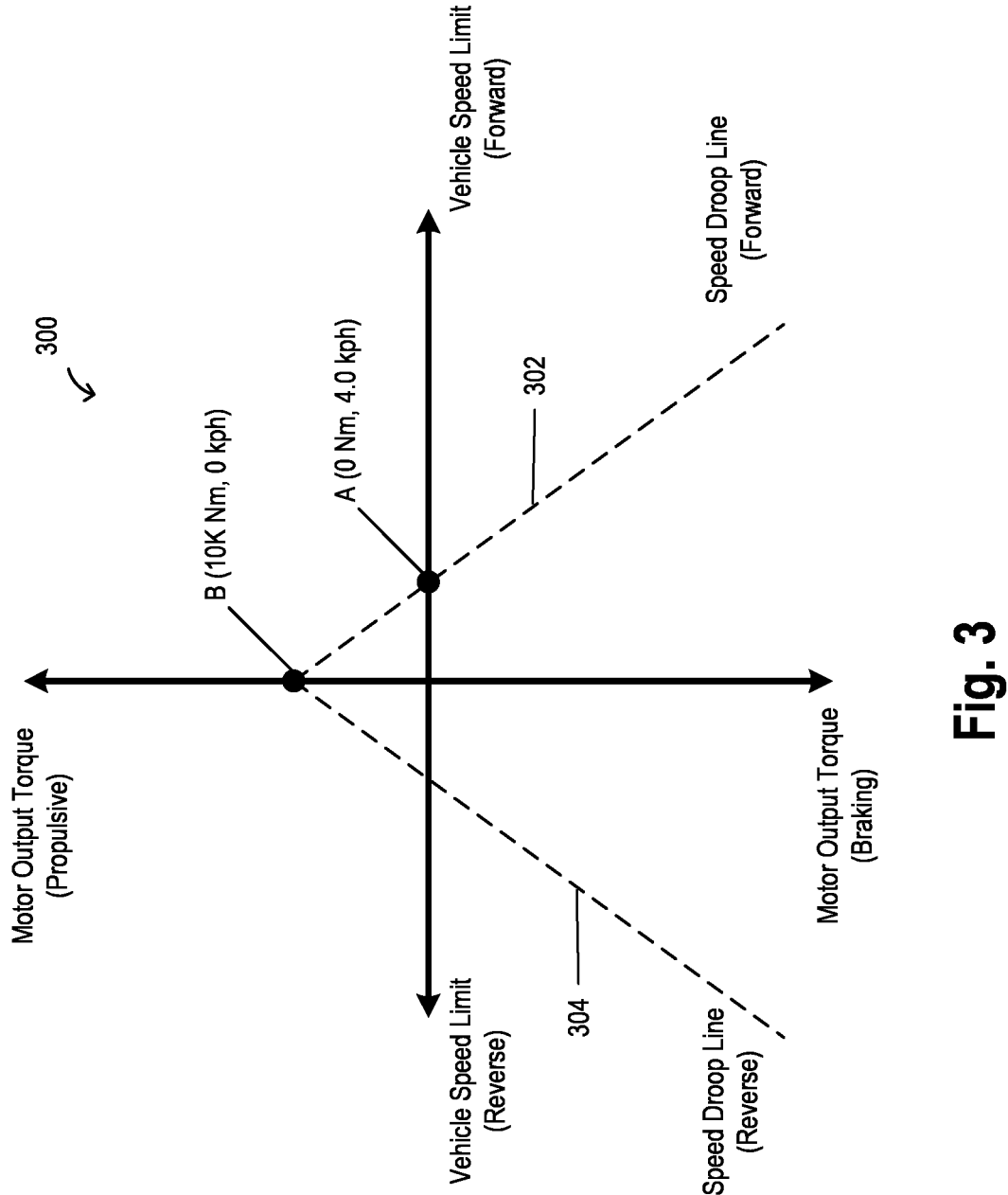
FIG. 3 shows a diagram of example vehicle speed limits according to an output torque when the brake mechanism in the vehicle of FIG. 1 is activated, according to an example embodiment.

FIG. 3 shows a diagram 300 of example vehicle speed limits according to an output torque, according to an example embodiment. In the diagram 300, a vehicle speed limit of the vehicle 100 is shown on an X axis, with positive values denoting a forward direction and negative values denoting a reverse direction, while a motor output torque (e.g., of the motor 113) is shown in a Y axis, with positive values denoting a propulsive force and negative values denoting a braking force.

Generally, the output torque corresponds to a load on the motor 113. For example, the controller 221 may provide commands and/or parameters to the motor 113 to cause the motor to accelerate the vehicle 100 to a vehicle speed limit according to the vehicle speed governor 222. In the example shown in FIG. 3, the vehicle speed limit corresponds to a creep vehicle speed limit of 4.0 kilometers per hour in either a forward direction (speed droop line 302) or a reverse direction (speed droop line 304). At a starting speed of zero kilometers per hour, the controller 221 may cause the motor 113 to accelerate at a predetermined rate (e.g., 1 kilometer per hour per second). The predetermined rate may be a system parameter set to improve safety, reduce battery consumption, improve maneuverability, etc. At a predetermined rate of 1 kilometer per hour per second, the vehicle 100 generally takes 4 seconds to reach the creep vehicle speed limit of 4 kilometers per hour.

Generally, an output torque suitable to provide the predetermined rate of acceleration is dependent upon a load on the motor and is based on a combined weight of the vehicle 100 (including any trailers, payload, cargo, etc.), a grade of a surface on which the vehicle 100 is moving (e.g., up a hill, down a hill, level terrain), and rolling resistance (e.g., due to tire pressure, tire material, tire tread, smoothness/softness of the surface, etc.). However, the vehicle speed system 200 may reduce the vehicle speed limit from 4 kilometers per hour to reduce battery consumption or to provide a desired driving experience to an operator of the vehicle 100. For example, the desired driving experience may emulate a vehicle with an automatic transmission that slows down (e.g., reduced power output) when encountering an increase in load, such as when rolling over a speed bump or rolling up a steep grade.

In the example shown in FIG. 3, at a location A on the speed droop line 302, the output torque of the motor 113 is 0 Newton meters (Nm) and the creep vehicle speed limit is 4 kilometers per hour. However, as output torque of the motor 113 increases, up to a maximum of 10 K Nm, vehicle speed governor 222 reduces the creep vehicle speed limit according to the speed droop line 302. For example, at location B on the speed droop line 302, the creep vehicle speed limit is reduced to zero kilometers per hour when an output torque of the motor 113 has reached 10 K Nm, with a linear reduction from location B to location A as the output torque increases. A similar creep vehicle speed limit is provided in the reverse direction using the speed droop line 304.

In some scenarios, such as when a load of the motor 113 is higher due to pulling a heavy trailer (e.g., 100,000 pounds, 200,000 pounds, etc.), an output torque of 10 K Nm is insufficient to accelerate to the creep vehicle speed limit with a desired driving experience. For example, a vehicle pulling a 200,000 pound trailer may need 8 K Nm of output torque just to overcome rolling resistance, with a corresponding reduction in the creep vehicle speed limit to approximately 1 kilometer per hour. Since this reduced creep vehicle speed limit substantially slows down the vehicle 100, the vehicle speed system 200 is configured to use a different proportional reduction in some scenarios, as described below.

Figure 4:
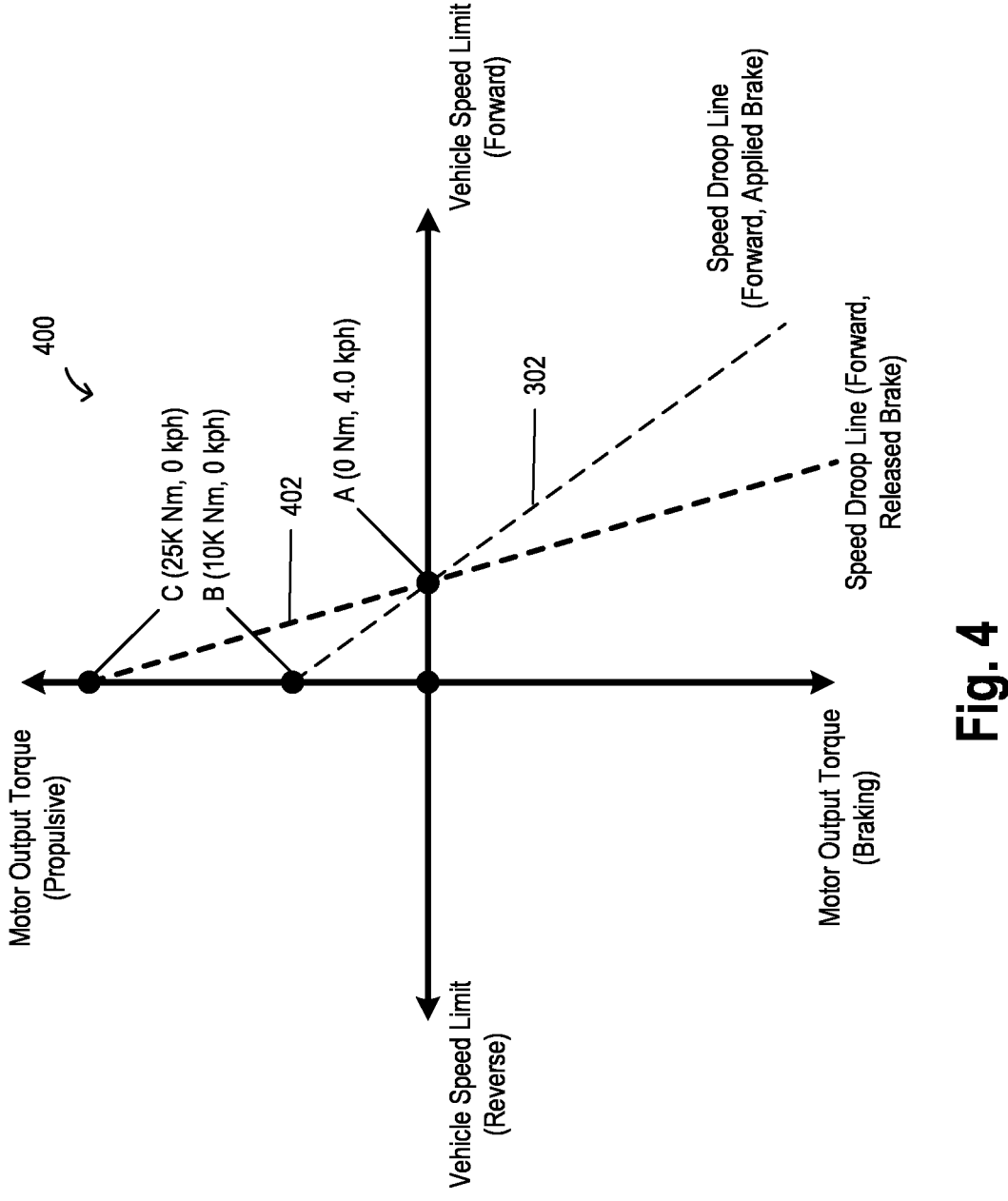
FIG. 4 shows a diagram of example vehicle speed limits according to an output torque when the brake mechanism in the vehicle of FIG. 1 is released, according to an example embodiment.

FIG. 4 shows a diagram of example vehicle speed limits according to an output torque when the brake mechanism in the vehicle of FIG. 1 is released, according to an example embodiment. In some scenarios, when the vehicle 100 is heavily loaded, an output torque of the motor 113 according to the speed droop line 302 when creeping (creep torque) is not strong enough to move the vehicle 100, the operator would need to use the accelerator pedal 122 to move the vehicle 100. In the example of FIG. 4, the vehicle speed governor 222 uses a different speed droop line 402 when the brake mechanism 120 is in a released state, but uses the speed droop line 302 when the brake mechanism 120 is in an applied state. As shown in FIG. 4, the speed droop line 402 has a steeper slope so that a proportional reduction of the speed droop line 402 is lower than a proportional reduction of the speed droop line 302. Generally, at location C on the speed droop line 402, the creep vehicle speed limit is reduced to zero kilometers per hour when an output torque of the motor 113 has reached 25 K Nm, with a linear reduction from location C to location A as the output torque increases. When the speed droop line 402 is utilized, the operator can more easily modulate the creep torque solely with brake pressure, allowing greater vehicle control in tight spaces such as in ports, loading docks, airport terminals, parking lots, etc.

As shown in FIG. 4, for a given load on the motor 113 (i.e., a given point along the Y axis), a first proportional reduction of the speed droop line 402 is less than a second proportional reduction of the speed droop line 302. Accordingly, a load of 10 K Nm of output torque on the speed droop line 302 may result in a creep vehicle speed limit of 0 kilometers per hour, which may stall the vehicle or disable the creep feature, while the corresponding droop on the speed droop line 402 results in a creep vehicle speed limit of approximately 3 kilometers per hour. As shown in FIG. 4, the speed droop function is 402 is configured to be operable over a first range of the load (e.g., zero to 25 K Nm) and the speed droop line 302 is configured to be operable over a second range of the load (e.g., zero to 10 K Nm) that is smaller than the first range.

Although the increased creep vehicle speed limits for a given output torque may improve acceleration of the vehicle, the increase in output torque may adversely affect a driving experience because a higher braking force from the brake mechanism 120 may be needed to overcome the output torque trying to meet the creep vehicle speed limit. To improve the driving experience, the vehicle speed governor 222 selects a first speed droop function (i.e., speed droop line 402) responsive to the brake mechanism 120 being in a released state and selects a second speed droop function (i.e., speed droop line 302) responsive to the brake mechanism 120 being in an applied state. In this way, a driver may release the brake pedal and have sufficient available torque from the motor 113 to move a very heavy vehicle, while upon application of the brake pedal, a reduced torque (i.e., from the braking system) is required to reduce the creep vehicle speed limit and stop the vehicle 100.

Although only two droop lines (302 and 402) are shown in FIG. 4, the vehicle speed governor 222 may comprise additional speed droop lines for other scenarios. In some examples, the vehicle speed governor 222 comprises different speed droop lines for at least some gears of the transmission 112. For example, the vehicle speed governor 222 may have a final drive droop line that is selected when a final gear of the transmission 112 is selected. The final drive droop line may limit output torque applied to the transmission 112 when the final gear is selected.

In other examples, additional droop lines may be used for different battery consumption and/or battery efficiency profiles, operator profiles, weight loading profiles, etc. Different profiles may correspond to different slopes of the droop line, offsets applied to the droop line (e.g., to raise a speed limit for reverse), a change in slope over the droop line (e.g., a curved droop line having a shallower slope for higher torque values and a steeper slope for lower torque values). In one example, a more experienced operator may select an "advanced" profile having steeper droop lines for faster speeds and improved responsiveness to the brake pedal, while a less experienced operator may select a "beginner" profile having shallower droop lines, which may provide slower acceleration and/or speeds when moving in reverse and/or creeping. As another example, an operator may select a high load profile that corresponds to a high vehicle load (e.g., 100,000 pounds, 200,000 pounds) having steeper droop lines or a low load profile that corresponds to an unloaded or low vehicle load (e.g., 10,000 pounds). In some examples, the vehicle speed governor 222 automatically selects an appropriate profile or speed droop line according to data and/or inputs from the sensors 123, the vehicle subsystems 140, the operator I/O device 135, or other suitable inputs.

FIG. 5 shows a flowchart of an example method 500 for controlling a vehicle speed of a vehicle, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by the controller 150, the vehicle speed system 200 (e.g., via the controller 221, the vehicle speed governor 222, the vehicle speed sensor 223, the brake sensor 224), or other suitable computing device or controller.

Method 500 begins with step 502. At step 502, an application status of a brake mechanism for a vehicle is received. The vehicle may correspond to the vehicle 100 and the brake mechanism may correspond to the brake mechanism 120, for example. The vehicle may comprise a direct-drive electric vehicle or a hybrid vehicle and the motor may be operably coupled to a battery and a charge system (e.g., battery 132 and charge system 134).

The brake sensor 224 may determine the application status and provide a suitable indication or signal to the vehicle speed governor 222, in some examples. In other examples, the brake mechanism 120 and/or a sensor 123 provides the indication or signal to the vehicle speed governor 222. As described above, the application status may be a released state where a minimum actuation force and/or minimum travel distance has not been met, or an applied state where the minimum actuation force and/or minimum travel distance have been met. In some examples, the application status also includes an activation pressure and/or travel distance of the brake pedal.

At step 504, a first speed droop function is selected responsive to the brake mechanism being in the released state and a second speed droop function is selected responsive to the brake mechanism being in the applied state. In some examples, the first speed droop function provides a first proportional reduction and the second speed droop function provides a second proportional reduction, where the first proportional reduction is lower than the second proportional reduction. The first speed droop function may correspond to the speed droop line 402 and the second speed droop function may correspond to the speed droop line 302, for example.

At step 506, a vehicle speed limit is adjusted according to the selected speed droop function. For example, the vehicle speed governor 222 adjusts the creep vehicle speed limit according to an output torque of the motor 113. As described above, the vehicle speed governor 222 may use a determined load of the motor 113 to identify a vehicle speed limit along the selected speed droop line (302 or 402). In some examples, the vehicle speed governor 222 determines the load of the motor 113. In other examples, the controller 150 and/or vehicle subsystems 140 determine the load and provide a suitable indication or parameter to the vehicle speed governor 222. The load of the motor 113 may be determined based on one or more of a voltage level applied to the motor 113, a flow of electrical current to the motor 113, one or more strain gauges (e.g., sensors 123) coupled with one or more components of the powertrain system 110, accelerometers, or other suitable values and/or sensors. In some examples, the load is determined based on a change in vehicle speed for a current output torque of the motor 113 (e.g., reduced speed and/or acceleration for a given output torque indicates an increased load).

At step 508, the output torque of the motor is adjusted according to the vehicle speed limit and a vehicle speed signal corresponding to a vehicle speed of the vehicle. For example, the controller 221 may adjust the output torque of the motor 113 according to the creep vehicle speed limit from the vehicle speed governor 222 and the vehicle speed from the vehicle speed sensor 223.

In some examples, step 506 comprises reducing the vehicle speed limit as the load of the motor increases according to the selected speed droop function. For example, as a load along speed droop line 402 increases (moving up the Y axis), the vehicle speed limit is reduced (moving left along the X axis). The first proportional reduction (i.e., with the brake released) is less than the second proportional reduction (i.e., with the brake applied) for a given load of the motor. Advantageously, having different proportional reductions allows for less force from the brake mechanism 120 to be used to slow and/or stop the vehicle 100, while still providing sufficient output torque to move a heavily loaded vehicle.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:
1. A system for controlling a vehicle speed of a vehicle, the system comprising:

a motor configured to provide an output torque for driving the vehicle;

a vehicle speed sensor that provides a vehicle speed signal corresponding to the vehicle speed;

a vehicle speed governor having a vehicle speed limit for the vehicle, wherein the vehicle speed governor adjusts the vehicle speed limit according to a desired direction of travel of the vehicle and a load corresponding to the motor, the desired direction of travel being selectable by an operator of the vehicle; and a controller configured to adjust the output torque of the motor according to the vehicle speed limit and the vehicle speed signal, wherein the controller is configured to receive the vehicle speed signal as a primary feedback input and to modulate the output torque of the motor to maintain a target vehicle speed, the modulation being performed independent of terrain grade, vehicle configuration parameters, and operator inputs, and wherein the vehicle speed governor selects from a set of predefined vehicle speed limits based on a selected direction of travel and applies a speed droop function that reduces the selected speed limit in proportion to motor load, wherein the speed droop function is selected based on a brake mechanism status.

2. The system of claim 1, wherein:

the vehicle speed limit is a first vehicle speed limit for a reverse direction of travel for the vehicle;

the vehicle speed governor has a second vehicle speed limit for a non-reverse direction of travel for the vehicle; and the first vehicle speed limit is lower than the second vehicle speed limit, wherein:

the first vehicle speed limit is selected when a reverse gear of the vehicle is selected;

the second vehicle speed limit for the non-reverse direction is selected when a first forward gear of the vehicle is selected;

the vehicle speed governor has a third vehicle speed limit for the non-reverse direction of travel;

the third vehicle speed limit is selected when a second forward gear of the vehicle is selected; and the third vehicle speed limit is higher than the second vehicle speed limit.

3. The system of claim 1, wherein the vehicle speed governor dynamically reduces the vehicle speed limit in response to an increase in the load corresponding to the motor and the controller adjusts the output torque of the motor according to the reduced vehicle speed limit and the vehicle speed signal, and wherein the vehicle speed governor reduces the vehicle speed limit using the load as an input to a speed droop function that provides a proportional reduction to the vehicle speed limit.

4. The system of claim 3, the system further comprising:

a brake mechanism configured to receive an indication of a desired change in the vehicle speed;

wherein the speed droop function is a first speed droop function that provides a first proportional reduction, the vehicle speed governor having a second speed droop function that provides a second proportional reduction; and wherein the vehicle speed governor uses the first speed droop function responsive to the brake mechanism being in a released state and uses the second speed droop function responsive to the brake mechanism being in an applied state.

5. The system of claim 4, wherein the first proportional reduction is lower than the second proportional reduction.

6. The system of claim 4, wherein:

the first speed droop function is configured to be operable over a first range of the load; and the second speed droop function is configured to be operable over a second range of the load that is smaller than the first range.

7. The system of claim 4, wherein the first proportional reduction is less than the second proportional reduction for a given load of the motor.

8. The system of claim 1, wherein the vehicle comprises a direct-drive electric vehicle or a hybrid vehicle and the motor is operably coupled to a battery and a charge system, the modulation being performed independent of the terrain grade, the vehicle configuration parameters including gear ratio and tire size, and the operator inputs including accelerator pedal position.

9. A system for controlling a vehicle speed of a vehicle, the system comprising:

a motor configured to provide an output torque for driving the vehicle;

a vehicle speed sensor that provides a vehicle speed signal corresponding to the vehicle speed of the vehicle;

a brake mechanism configured to receive an indication of a desired change in the vehicle speed;

a vehicle speed governor having a vehicle speed limit for the vehicle, wherein the vehicle speed governor adjusts the vehicle speed limit according to a first speed droop function responsive to the brake mechanism being in a released state and according to a second speed droop function responsive to the brake mechanism being in an applied state; and a controller configured to adjust the output torque of the motor according to the vehicle speed limit and the vehicle speed signal, wherein the vehicle speed governor is configured to select from a plurality of predefined speed droop functions based on a detected drive mode and brake application state, and to apply the selected speed droop function to dynamically reduce the vehicle speed limit in response to increased motor load, such that the vehicle speed limit in reverse mode is lower than in forward mode, and transitions between modes are applied without recalibration of control parameters, and wherein the plurality of predefined speed droop functions includes at least one droop function for a reverse drive mode that applies a lower target speed limit, and a second droop function for a forward drive mode that applies a higher target speed limit, each responsive to brake status, and wherein transitions between the droop functions are applied dynamically without requiring calibration adjustments.

10. The system of claim 9, wherein:

the vehicle speed governor dynamically reduces the vehicle speed limit in response to an increase in a load corresponding to the motor; and the controller adjusts the output torque of the motor according to the reduced vehicle speed limit and the vehicle speed signal.

11. The system of claim 10, wherein the first speed droop function provides a first proportional reduction and the second speed droop function a second proportional reduction.

12. The system of claim 11, wherein the first proportional reduction is lower than the second proportional reduction.

13. A method for controlling a vehicle speed of a vehicle, the method comprising:

receiving an application status of a brake mechanism for the vehicle;

selecting a first speed droop function responsive to the brake mechanism being in a released state and a second speed droop function responsive to the brake mechanism being in an applied state;

adjusting a vehicle speed limit according to the selected speed droop function;

adjusting an output torque of a motor for driving the vehicle according to the vehicle speed limit and a vehicle speed signal corresponding to the vehicle speed of the vehicle; and selecting the vehicle speed limit based on a direction of travel and applying a direction-specific droop function that reduces the selected speed limit in proportion to motor load and a status of the brake mechanism, wherein a controller is configured to prevent successive adjustments to the vehicle speed limit in response to transient changes in motor load by applying a delay before modifying the vehicle speed limit, such that the output torque of the motor remains stable unless a sustained change in load is detected.

14. The method of claim 13, wherein adjusting the vehicle speed limit comprises reducing the vehicle speed limit as a load of the motor increases according to the selected speed droop function.

15. The method of claim 14, wherein:

the first speed droop function provides a first proportional reduction and the second speed droop function a second proportional reduction; and the first proportional reduction is lower than the second proportional reduction.

16. The method of claim 15, wherein the first proportional reduction is less than the second proportional reduction for a given load of the motor.

17. The system of claim 1, wherein the vehicle speed governor is further configured to select the speed limit from among a plurality of limits based on a gear selection and a direction of travel.

18. The system of claim 1, wherein the speed droop function is dynamically switched based on a brake status signal without recalibration of torque-speed mappings.

19. The system of claim 9, wherein the controller is configured to disable application of a selected speed droop function during a predefined limp-home mode or service state to enable continued operation of the vehicle with reduced performance while preventing undesirable modulation of the vehicle speed limit under at least one of fault conditions and service conditions.

20. The method of claim 13, further comprising determining the application status of the brake mechanism from at least one of a hydraulic pressure sensor and an electronic brake control unit, wherein the brake status is used to select or modify a speed droop function applied by the controller to dynamically govern the vehicle speed limit.

* * * * *